US012716690B1

(12) United States Patent
Jacobson

(10) Patent No.: US 12,716,690 B1
(45) **Date of Patent: *Aug. 25, 2026**

(54) ACCESSORY MOUNTS

(71) Applicant: Magne-Tech, LLC, Farr West, UT (US)

(72) Inventor: Joel B. Jacobson, Farr West, UT (US)

(73) Assignee: Magne-Tech, LLC, Farr West, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,767

(22) Filed: Apr. 26, 2024

Related U.S. Application Data

(63) Continuation of application No. 17/407,137, filed on Aug. 19, 2021, now Pat. No. 12,287,175.

(60) Provisional application No. 63/068,739, filed on Aug. 21, 2020.

(51) Int. Cl.
*F41G 11/00* (2006.01)
*F16B 1/00* (2006.01)
*F16M 13/02* (2006.01)
*H01F 7/02* (2006.01)

(52) U.S. Cl.
CPC ............. *F41G 11/002* (2013.01); *F16B 1/00* (2013.01); *F16M 13/022* (2013.01); *H01F 7/0263* (2013.01); *F16B 2200/83* (2023.08)

(58) Field of Classification Search
None
See application file for complete search history.

(56) References Cited

U.S. PATENT DOCUMENTS 6,598,271 B2 7/2003 Nire
6,857,169 B2 2/2005 Chung
7,843,295 B2 11/2010 Fullerton
8,341,988 B2 1/2013 Nickeas
8,368,494 B2 2/2013 Fiedler
8,555,468 B2 10/2013 Moerke
8,845,123 B2 9/2014 Fridley
9,221,397 B1 12/2015 Kim
9,677,854 B1 6/2017 Tran
9,689,527 B2 6/2017 Franklin
9,920,877 B2 3/2018 Conti
10,151,564 B2 12/2018 Galli
10,215,349 B1 2/2019 Robota
10,237,384 B2 3/2019 Holder
10,492,602 B2 12/2019 Bryans
10,551,145 B2 2/2020 Kincel
10,583,891 B2 3/2020 Jentzsch
10,634,455 B2 4/2020 Galli
10,655,656 B2 5/2020 Franklin
10,703,429 B2 7/2020 Fiedler
10,724,569 B2 7/2020 Windfeldt
10,813,415 B2 10/2020 Lee (Continued)

*Primary Examiner* — Jonathan P Masinick
(74) *Attorney, Agent, or Firm* — Lowenstein Sandler LLP

(57) ABSTRACT

A system includes a mounting portion and an accessory portion. The mounting portion includes an alignment projection protruding from a first surface, a mount-side recess formed in the first surface and offset from the alignment projection, and a mount-side object disposed in the mount-side recess. The accessory portion includes a second surface forming an alignment recess configured to receive the alignment projection of the mounting portion, and an accessory-side object disposed in the accessory-side recess. The accessory-side object and the mount-side object are configured to couple to removably secure the accessory portion to the mounting portion.

19 Claims, 7 Drawing Sheets

(56) References Cited

U.S. PATENT DOCUMENTS

| | | | |
|---|---|---|---|
| 10,907,341 | B2 | 2/2021 | Edwards |
| 10,969,042 | B2 | 4/2021 | Cuber |
| 11,484,086 | B2 | 11/2022 | Kushnirov |
| 2008/0187393 | A1 | 8/2008 | Nellessen |
| 2016/0037868 | A1 | 2/2016 | Lambert |
| 2016/0202056 | A1 | 7/2016 | Senger |
| 2017/0341871 | A1 | 11/2017 | Peters |
| 2018/0178868 | A1 | 6/2018 | Hsu |
| 2021/0160406 | A1 | 5/2021 | Green |

ACCESSORY MOUNTS

RELATED APPLICATIONS

This patent application is a continuation of U.S. Non-provisional patent application Ser. No. 17/407,137, filed on Aug. 19, 2021, which claims priority to U.S. Provisional Patent Application No. 63/068,739, filed on Aug. 21, 2020, the entire contents of which are incorporated by reference herein.

BACKGROUND

Flashlights and other tools are commonly a hand-held item. Hand-held tools generally provide portability, are readily manipulated, and may exhibit flexibility in deployment and use. Some tools require only a single hand to operate or use the tool while other tools may require both hands for use and/or operation of the tool.

BRIEF DESCRIPTION OF THE DRAWINGS

The present description will be understood more fully when viewed in conjunction with the accompanying drawings of various examples of accessory mounts. The description is not meant to limit the accessory mounts to the specific examples. Rather, the specific examples depicted and described are provided for explanation and understanding of accessory mounts. Throughout the description the drawings may be referred to as drawings, figures, and/or FIGs.

DETAILED DESCRIPTION

Accessory mounts, as disclosed herein, will become better understood through a review of the following detailed description in conjunction with the figures. The detailed description and figures provide merely examples of the various embodiments of accessory mounts. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional accessory mounts may include direct couplings to handguards or other structures or surfaces. In some conventional accessory mounts, an accessory is coupled to a structure or surface in such a way as to be difficult to remove or impossible to remove with relative speed. This may be inconvenient, frustrating, or even dangerous. For example, some mounts require a screwdriver, hex wrench, or other tool to remove the accessory from the mounted position. This may cost valuable time or be nearly impossible if the correct tool is not on-hand at the time. Other examples may have a higher likelihood of not being self-zeroing (i.e. pre-aligned), or being shaken loose when subjected to impulse forces, jarring, shocks, or other forces that may be a product of the surface or structure to which the accessory is mounted or a product of the environment or use of the accessory or the surface or structure to which the accessory is mounted.

Implementations of accessory mounts, described herein, may address some, or all, of the problems described above. Accessory mounts may include weapon mounts, helmet mounts, and so forth. Embodiments allow the relatively rapid attachment and detachment of an accessory from a mounting surface. For example, an accessory mount may couple a flashlight to a firearm handguard or a helmet to allow for quick deployment and removal by a user using the force generated by a user's hand in a direction conducive to the accessory's removal.

Figure 1:
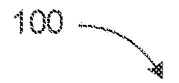
FIG. 1 illustrates an exploded view of an accessory mount, according to an embodiment.
Figure 1:
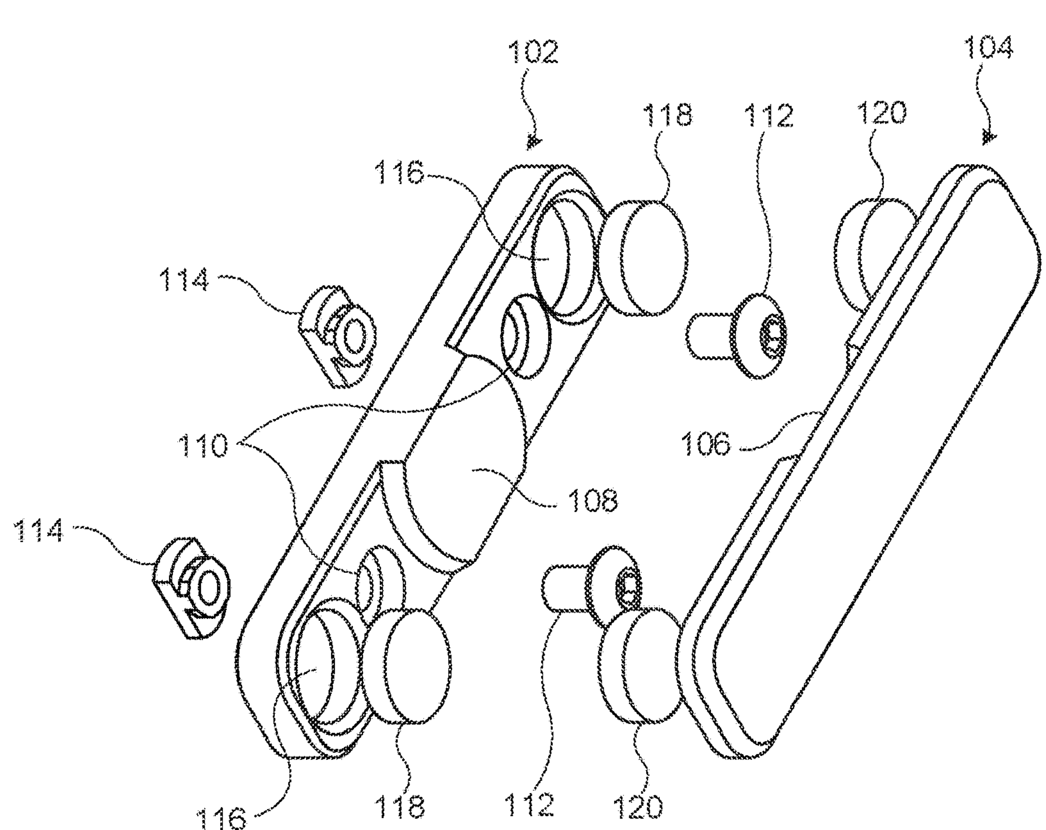

FIG. 1 illustrates an exploded view of an accessory mount, according to an embodiment. Embodiments may provide quick attachment and/or release of accessories.

Embodiments may include a mounting portion 102 and an accessory portion 104. The mounting portion 102 may be configured to attach to a surface or structure. The accessory portion 104 may be configured to couple to an accessory.

In some embodiments, the mounting portion 102 includes an alignment projection 108 formed in the mounting portion 102 to receive an alignment recess 106 formed on the accessory portion 104. In some embodiments, the alignment recess 106 is shaped to interface with the alignment projection 108 so as to align the accessory portion 104 with the mounting portion 102. In some embodiments, the alignment recess 106 and the alignment projection 108 interface with one another to align the mounting portion 102 and the accessory portion 104 translationally and/or rotationally relative to one another.

Embodiments of the alignment recess 106 may have an ovular geometry. In other embodiments, the alignment recess 106 may be circular, angular, or otherwise. The alignment recess 106 may have a relief angle, or chamfer, in which one or more of the sides of the alignment recess 106 opens outward. In some embodiments, the alignment projection 108 has a matching relief angle, or chamfer, tapering inward to match the alignment recess 106.

In some embodiments, the alignment projection 108 may be centrally located on the mounting portion 102. In some embodiments, the mounting portion 102 may include one or more through holes 110. The through holes 110 may be shaped to accept or accommodate a fastener 112. For example, the fastener 112 may include a screw, bolt, rivet, or other removable or non-removable structures. The through holes 110 may be recessed to allow for flush interface of the mounting portion 102 and the accessory portion 104. In some embodiments, the fastener 112 may be separate from the through holes 110. In other embodiments, the fastener 112 may be captive within the through holes 110. In some embodiments, the fastener 112 may be integrated into the through holes 110. In some embodiments, the through holes 110 may be positioned alongside or proximate the alignment projection 108 and on opposite sides of the alignment projection 108 from one another. The through holes 110 may be oriented along a midline of the mounting portion 102. In other embodiments, the through holes 110 may be positioned offset from the midline of the mounting portion 102. The mounting portion 102 may include a single through hole 110 or multiple through holes 110.

In some embodiments, the fasteners 112 may be configured to interface with a retaining element 114. The retaining element 114 may be configured to interface with the fasteners 112 to apply a securing force at a surface or structure to which the mounting portion 102 is to be secured. The retaining element 114 may be configured to interface with a mounting system such as the M-Loc™ mounting system or other proprietary or non-proprietary mounting systems or structures. In some embodiments, the retaining element 114 may be configured to rotate to engage a mounting structure. In other embodiments, the retaining element 114 may be inserted into the mounting structure, slid into place, and then tightened via the fasteners 112.

The mounting portion 102 may also include mount-side magnet seats 116. The mount-side magnet seats 116 may be configured to receive mount-side magnets 118. The mount-side magnet seats 116 may be disposed in the mounting portion 102 of the accessory mount 100 to be at either end of the mounting portion 102. The mount-side magnet seats 116 may be circular in geometry. In other embodiments, the mount-side magnet seats 116 may be non-circular. In some embodiments, the geometry of the mount-side magnet seats 116 corresponds to a geometry of the mount-side magnets 118. In some embodiments, the magnet seats 116 may include a chamfer or relief angle at least partially surrounding the magnet seats 116. The chamfer or relief angle may be a negative structure recessing the magnet seat 116 into a surface of the mounting portion 102. In some embodiments, the chamfer or relief angle is a positive structure raising the magnet seat 116 to project outward from the surface of the mounting portion 102.

In some embodiments, the mount-side magnet seats 116 are positioned to be outward from the through holes 110 relative to the alignment projection 108. In other embodiments, the mount-side magnet seats 116 may be positioned inward from the through holes 110 relative to the alignment projection 108.

In some embodiments, the mount-side magnet seats 116 are holes formed completely through a thickness of the mounting portion 102. In other embodiments, the mount-side magnet seats 116 are recesses formed in the mounting portion 102 without passing all the way through the thickness of the mounting portion 102. In some embodiments, the mount-side magnet seats 116 may apply a friction fit or other mechanical retention of the mount-side magnets 118. In some embodiments, an adhesive or bonding agent may apply a retaining force to the mount-side magnets 118 to retain the mount-side magnets 118 within the mount-side magnet seats 116.

The accessory portion 104 may include accessory-side magnet s 120 positioned in the accessory portion 104 to magnetically align and magnetically couple with the mount-side magnets 118 when the accessory portion 104 is proximate the mounting portion 102. The accessory-side magnets 120 may be mechanically or chemically secured within the accessory portion 104 in an accessory-side magnet seat similar to the mount-side magnet seats 116. In some embodiments, the magnet seats of the accessory portion 104 may include a chamfer or relief angle at least partially surrounding the magnet seats of the accessory portion 104. The chamfer or relief angle may be a negative structure recessing the magnet seat into a surface of the accessory portion 104. In some embodiments, the chamfer or relief angle is a positive structure raising the magnet seat to project outward from the surface of the accessory portion 104. The chamfer or relief angle arrangement of the magnet seats of the accessory portion 104 may correspond to the chamfer or relief angle arrangement of the magnet seats 116 of the mounting portion 102. For example, a magnet seat of the accessory portion 104 may project outward to interface with a recessed magnet seat 116 of the mounting portion 102. The magnet seats of one portion 102/104 may be uniform or may be different. A uniform arrangement may allow for versatility in relative direction when magnetically coupling the accessory portion 104 to the mounting portion 102 while a differing arrangement may require a specific directional alignment to properly couple the accessory portion 104 to the mounting portion 102. In some embodiments, the accessory-side magnets 120 may be similarly shaped to the mount-side magnets 118. In other embodiments, the accessory-side magnets 120 may be different in size, shape, and/or strength to the mount-side magnets 118.

Figure 2:
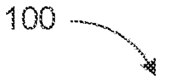
FIG. 2 illustrates top view and a side view of the mounting portion of an accessory mount, according to an embodiment.
Figure 2:
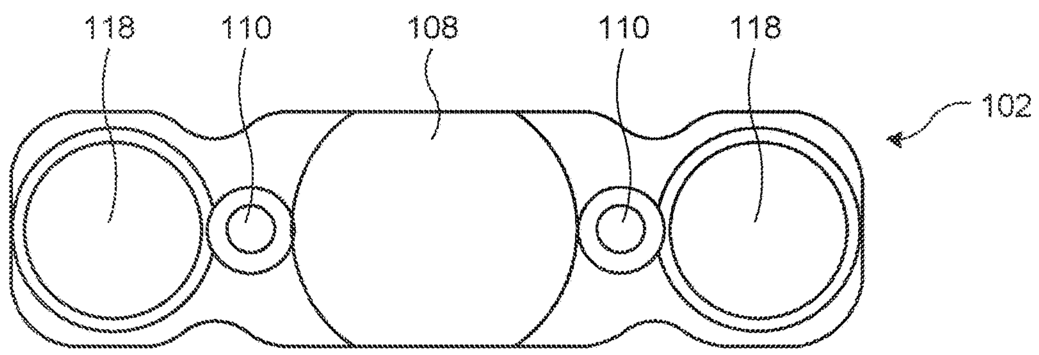
Figure 2:
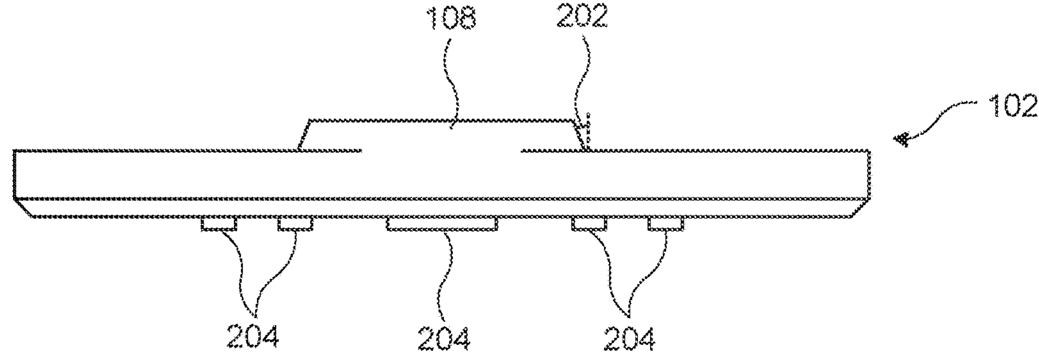

FIG. 2 illustrates top view and a side view of a mounting portion of an accessory mount, according to an embodiment. Embodiments may provide a relatively quick and simple attachment of an accessory to a mounting structure or surface.

In some embodiments, the alignment projection 108 has a sidewall that is offset at an angle 202 to improve engagement and disengagement. For example, the angle 202 may reduce binding between the alignment recess 106 and the alignment projection 108.

In some embodiments, the alignment projection 108 may be disposed on the mounting portion 102 of the accessory mount 100 with the alignment recess 106 disposed on the accessory portion 104. In some embodiments, the alignment projection 108 may be positioned on the accessory portion 104 with the alignment recess 106 disposed on the mounting portion 102. Some embodiments may include one or more interface structures 204. The interface structures 204 may be arranged or sized to interface with a structure to which it will be mounted. In some embodiments, the interface structure 204 may supplement or otherwise interact with the retaining element 114 (shown and described in FIG. 1). For example, the interface structure 204 may align with the retaining element 114 to provide a matched retaining arrangement for securing the accessory mount 100.

Figure 3:
FIG. 3 illustrates an upper perspective view of the accessory mount of FIG. 2, according to an embodiment.
Figure 3:
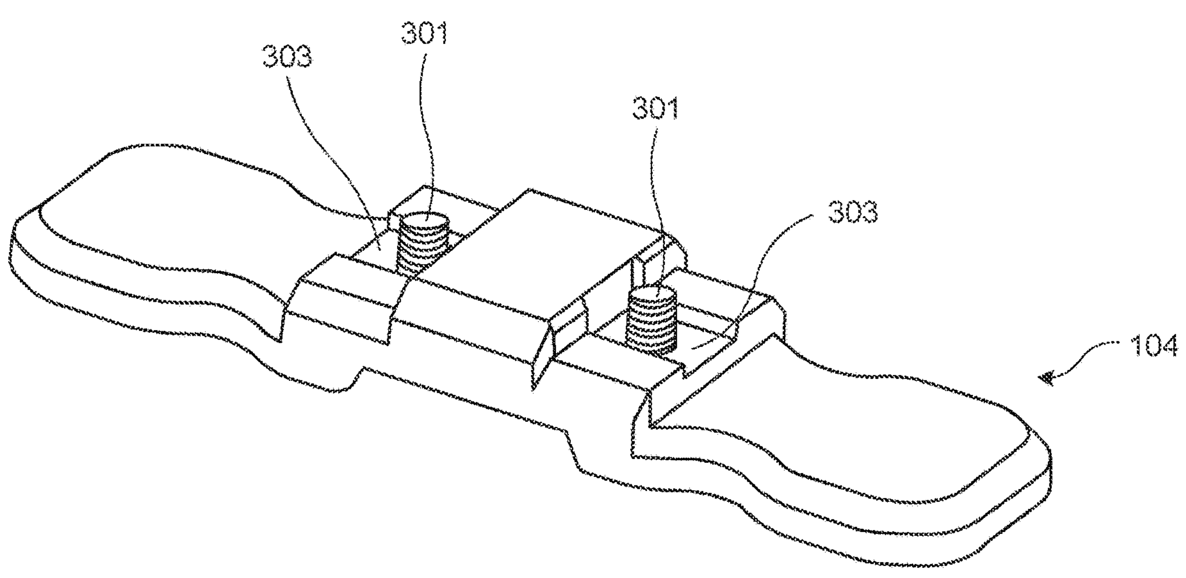
Figure 3:
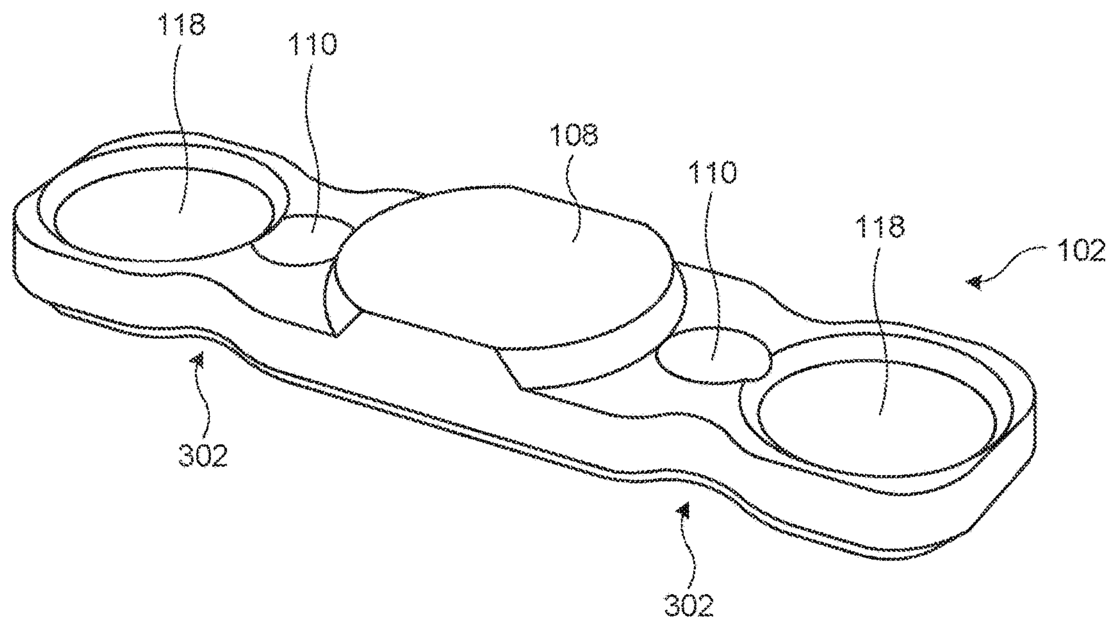

FIG. 3 illustrates an upper perspective view of the accessory mount 100 of FIG. 2, according to an embodiment. Embodiments may provide a versatile mounting interface capable of mounting to multiple surfaces and/or structures.

In some embodiments, the accessory portion 104 of the accessory mount 100 includes a coupling structure 301. The coupling structure 301 may be configured to couple an accessory to the accessory portion 104. In some embodiments, the coupling structure 301 may be a screw. In other embodiments, the coupling structure 301 may be a clip, friction fitting, adhesive element, magnetic element, or so forth. In some embodiments, the coupling structure 301 may be securely disposed on the accessory portion 104. In other embodiments, the coupling structure 301 may be removeable relative to the accessory portion 104. In some embodiments, the coupling structure 301 may be adjustable with respect to a coupling force exerted by the coupling structure 301 on the accessory and/or the accessory portion 104. In other embodiments, the coupling structure 301 may provide a fixed or uniform coupling force.

In some embodiments, the coupling structure 301 may be positioned to correspond with a surface feature 303 of the accessory portion 104. The surface feature 303 may be a raised or lower portion in a surface of the accessory portion 104. In some embodiments, the surface feature 303 engages with an accessory to couple the accessory to the accessory portion 104. In some embodiments, the surface feature 303 may provide for improved stability of the accessory portion 104 on the accessory. In other embodiments, the surface feature 303 may provide for improved ease in adjusting the coupling structure 301.

In some embodiments, the mounting portion 102 may include surface features such as cutaways 302 to reduce weight, material cost, increase ergonomics, and/or improve grip locations to assist in coupling or uncoupling the mounting portion 102 and the accessory portion 104.

Figure 4:
FIG. 4 illustrates a lower perspective view of the accessory mount of FIG. 2 with a first mount structure, according to an embodiment.
Figure 4:
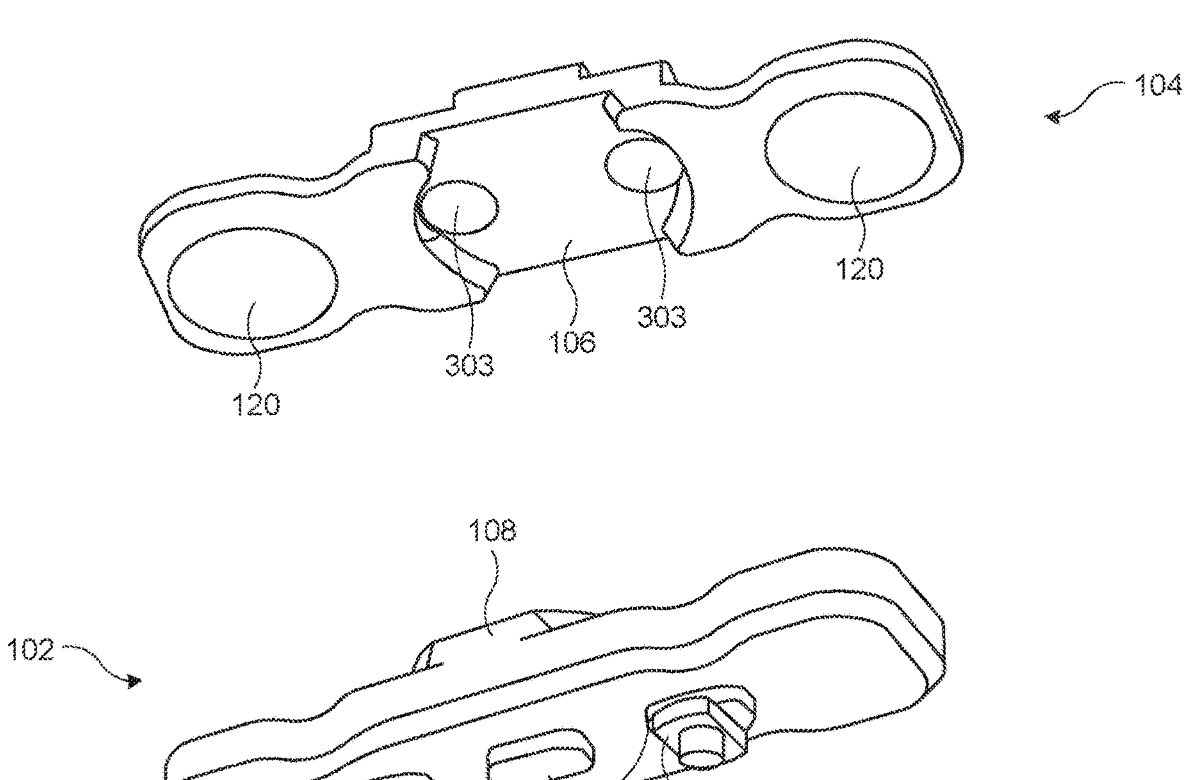

FIG. 4 illustrates a lower perspective view of the accessory mount 100 of FIG. 2 with a first mount structure, according to an embodiment. Embodiments provide a flexible accessory mount capable of removably coupling an accessory to a proprietary or non-proprietary mounting system.

In some embodiments, the retaining elements 114 may form a first mount structure 402 positioned on the mounting portion 102 to be opposite the alignment projection 108 or alignment recess 106. In some embodiments, the first mount structure 402 fits a specific mounting system such as an M-Lok™ mounting system. In other embodiments, the first mount structure 402 is configured to be compatible with more than one mounting system.

In some embodiments, the accessory portion 104 includes the coupling structures 303. In some embodiments, the coupling structures 303 may extend through a thickness of the accessory portion 104 to be accessible within the alignment recess 106 of the accessory portion 104. The coupling structures 303 may include interfaces to engage with a tool or other implement to operate the coupling structure 303 to secure an accessory relative to the accessory portion 104. In some embodiments, the coupling structure 303 may not extend to be accessible and/or visible from the side of the accessory portion 104 with the alignment recess 106. In other embodiments, the coupling structure 303 may be positioned outside of the alignment recess 106.

Figure 5:
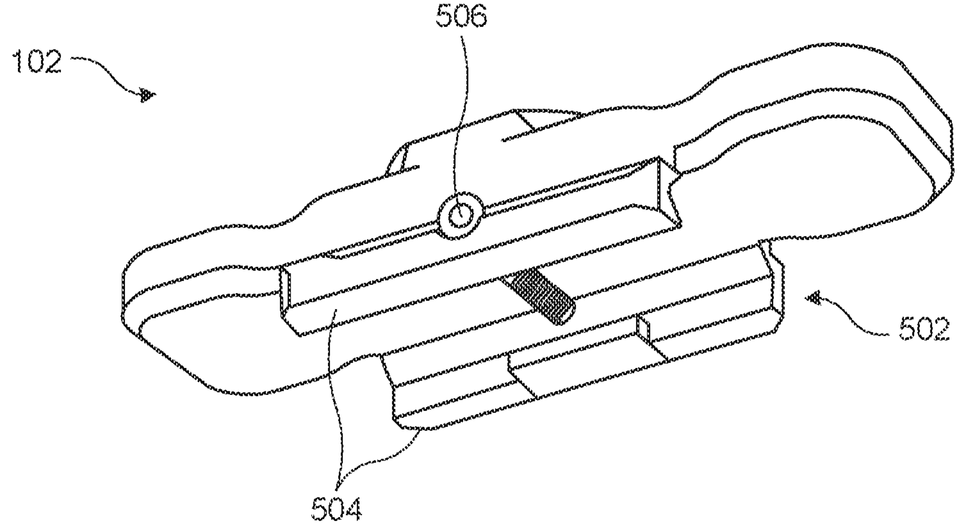
FIG. 5 illustrates a lower perspective view of the mounting portion of the accessory mount of FIG. 2 with a second mount structure, according to an embodiment.

FIG. 5 illustrates a lower perspective view of the mounting portion of the accessory mount of FIG. 2 with a second mount structure 502, according to an embodiment. Embodiments may provide adjustable connection with common and uncommon mounting systems.

In some embodiments, the second mount structure 502 includes clamps 504 configured to couple the mounting portion 102 to a mounting location on a surface or structure. The clamps 504 may be configured to engage a purpose-built mounting structure. For example, the clamps 504 may be configured to engage with a picatinny mounting system or the like.

The clamps 504 may be adjustable in force to allow for repositioning of the mounting portion 102 along the picatinny or other mounting system. In some embodiments, a clamping force of the clamps 504 may be adjusted by a closure mechanism 506. The closure mechanism 506 may include a screw, ratchet, pin, clip, etc.

Figure 6:
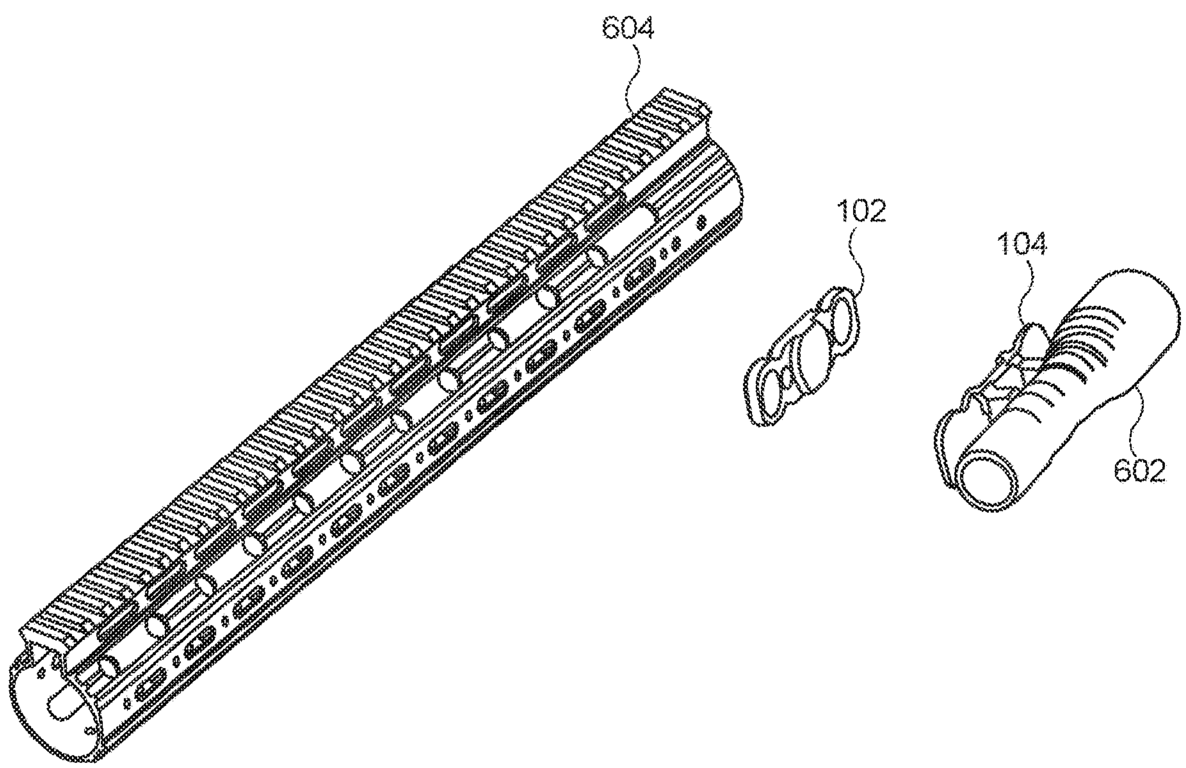
FIG. 6 illustrates an exploded view of the accessory mount of FIG. 2 with the accessory portion integrated into an accessory (i.e. flashlight) with the accessory mount positioned relative to a handguard, according to an embodiment.

FIG. 6 illustrates an exploded view of the accessory mount 100 of FIG. 1 with a flashlight 602 and a handguard 604, according to an embodiment. Embodiments may provide an unobtrusive mounting solution for accessories that is self-aligning and resistant to impulse forces.

In some embodiments, the accessory portion 104 may couple to a flashlight 602 or be integrated into the body of a flashlight. While a flashlight 602 is shown and discussed, the accessory portion 104 may also couple to, or be integrated as a unified structure with, other accessories or similar structures. Embodiments of the accessory portion 104 may couple to the flashlight 602 via one or more fasteners, adhesives, clips, and so forth.

In some embodiments, the mounting portion 102 may couple to a structure, for example, handguard 604. In some embodiments, the handguard 604 may be a firearm handguard or other structure to which a flashlight 602 or other accessory may be mounted. In some embodiments, the mounting portion 102 may couple to the handguard 604 via a mechanical coupling in which component of the mounting portion 102 engage with a cutout, recess, projection, or other structure of the handguard 604. With the mounting portion 102 secured to the handguard 604 and the accessory portion 104 secured to the flashlight 602, the flashlight 602 can easily and quickly be attached to, and removed from, the handguard 604 by magnetically joining the accessory portion 104 to the mounting portion 102. The configuration of the mounting portion 102 and the accessory portion 104 provides for alignment of the flashlight 602 when in place on the handguard 604.

In some embodiments, the accessory mount 100 is configured to withstand impulse forces applied at discharge of a firearm. For example, the accessory mount 100 may couple the flashlight 602 to a firearm. As the firearm is discharged, the handguard 604 is driven backward generating a shear or shearing force which tends to separate the mounting portion 102 from the accessory portion 104. In some embodiments, the combination of the alignment recess 106 and the alignment projection 108 with the magnets 118 and 120 provide a resilience to the force and retains the accessory mount 100 in place and intact.

Figure 7:
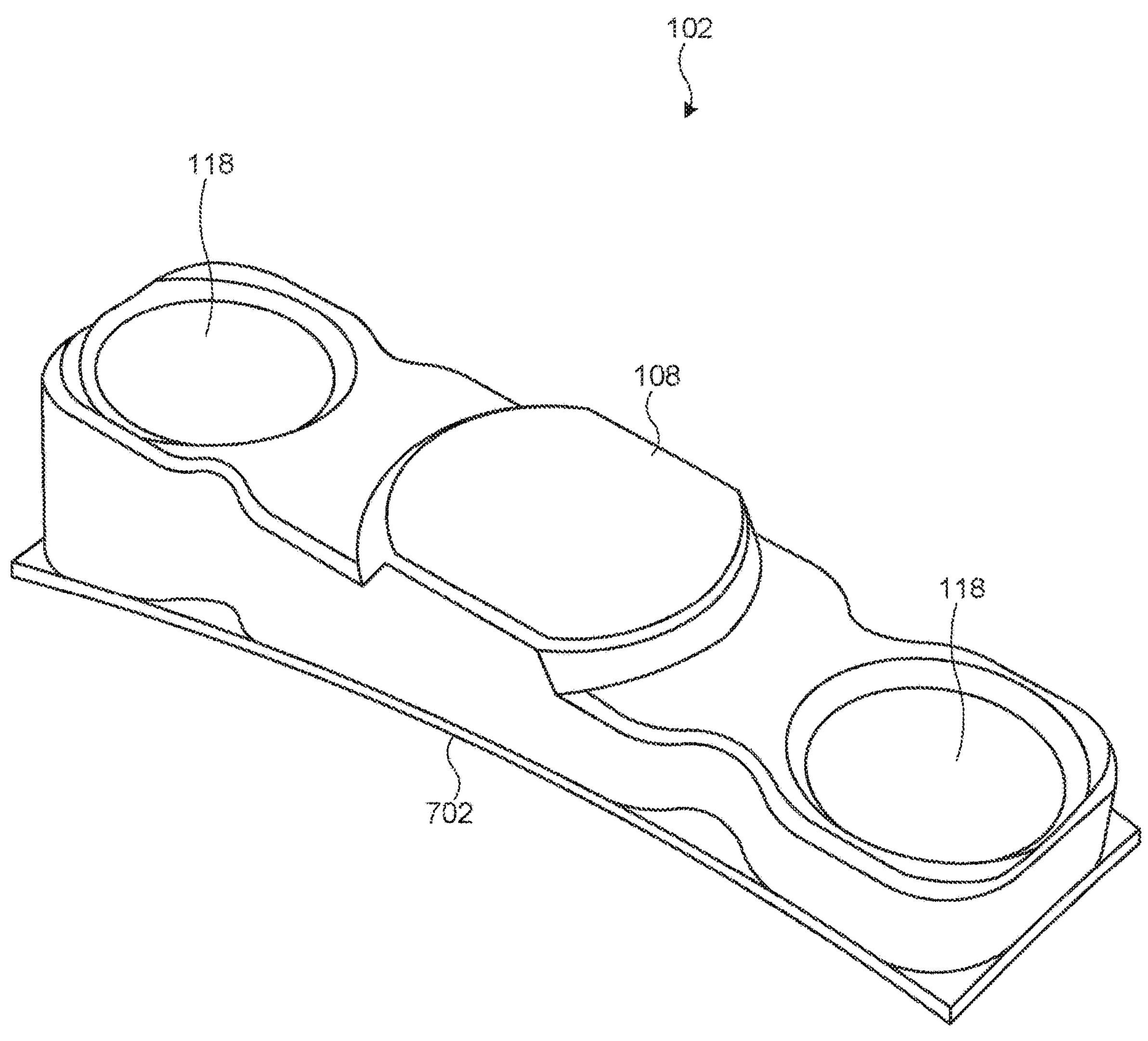
FIG. 7 illustrates a perspective view of the mounting portion of the mounting system designed for curved surfaces, according to an embodiment.

FIG. 7 illustrates a perspective view of an accessory mount for curved surfaces, according to an embodiment. Embodiments may provide flexible mounting to a variety of surface geometries.

In some embodiments, the mounting portion 102 may include a curved base 702. In some embodiments, the curved base 702 forms a curved structure in the mounting portion 102 which may allow for installation on a helmet or other structure having a curved surface geometry. The curved base 702 may change a relative elevation of the mount-side magnets 118. In some embodiments, the difference in elevation of the mount-side magnets 118 may align an accessory relative to the structure or surface to which the mounting portion 102 is coupled.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e, methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

What is claimed is:

1. A system comprising:

a mounting portion comprising:

an alignment projection protruding from a first surface of the mounting portion;

a mount-side recess formed in the first surface and offset from the alignment projection, wherein the mounting portion forms a through hole alongside the mount-side recess and extending through a thickness of the mounting portion; and a mount-side object disposed in the mount-side recess; and an accessory portion comprising:

a second surface forming an alignment recess configured to receive the alignment projection of the mounting portion;

an accessory-side recess formed in the second surface and offset from the alignment recess; and an accessory-side object disposed in the accessory-side recess, wherein the accessory-side object and the mount-side object are configured to couple to removably secure the accessory portion to the mounting portion.

2. The system of claim 1, wherein the through hole comprises a recess to accept a fastener and to allow the accessory portion to interface flush with the mounting portion.

3. The system of claim 1, wherein the mounting portion is configured to receive a fastener through the through hole to secure the mounting portion to a mount structure or a mount surface.

4. The system of claim 1, wherein the mounting portion is configured to couple to a mount structure on a side of the mounting portion opposite the alignment recess, and wherein the mounting portion is configured to secure to the mount structure.

5. The system of claim 4, further comprising:

a retaining element configured to engage with one or more fasteners positioned in one or more through holes of the mounting portion to secure the mounting portion relative to the mount structure.

6. The system of claim 4, wherein the mounting portion further comprises a clamp configured to engage with the mount structure.

7. The system of claim 1, wherein the mounting portion is configured to couple to a handguard of a firearm.

8. The system of claim 1, wherein the accessory portion comprises at least one of a flashlight or an optic.

9. The system of claim 1, wherein the mount-side object comprises a first magnet, wherein the accessory-side object comprises a second magnet, and wherein the mounting portion and the accessory portion are configured to magnetically couple to each other to resist an impulse force generated by a discharge of a firearm.

10. The system of claim 1, wherein the mounting portion forms a first chamfer at least partially surrounding the mount-side recess, wherein the accessory portion forms a second chamfer at least partially surrounding the accessory-side recess, and wherein the first chamfer is configured to engage with the second chamfer.

11. A mounting portion comprising:

a first surface forming an alignment recess configured to receive an alignment projection of an accessory portion, the first surface having an elongated geometry;

a mount-side recess formed in the first surface, wherein the mount-side recess is offset from the alignment recess and proximate an end of the mounting portion, and wherein the mounting portion forms a through hole alongside the alignment recess and extending through a thickness of the mounting portion; and a mount-side object disposed in the mount-side recess and configured to engage with the accessory portion to removably secure the accessory portion to the mounting portion.

12. The mounting portion of claim 11, wherein the mounting portion is configured to couple to a handguard of a firearm.

13. The mounting portion of claim 12, wherein the mounting portion is configured to interface with the accessory portion to align the accessory portion with the mounting portion on the handguard to align an accessory with the firearm.

14. The mounting portion of claim 11, wherein the accessory portion comprises at least one of a flashlight or an optic.

15. The mounting portion of claim 11, wherein the mount-side object comprises a first magnet, and wherein the mounting portion is configured to magnetically secure the accessory portion to resist an impulse force generated by a discharge of a firearm.

16. The mounting portion of claim 11, wherein the alignment recess forms a first chamfer at least partially surrounding the alignment recess to align the accessory portion with the mounting portion, and wherein the mount-side recess forms a second chamfer configured to engage with an accessory-side recess to align the accessory portion.

17. A mount system comprising:

a mounting portion comprising:

a first alignment feature on a first side of the mounting portion; and a mount-side object disposed on the first side and offset from the first alignment feature, wherein the mounting portion forms a through hole alongside the mount-side object and extending through a thickness of the mounting portion; and an accessory portion comprising:

a second alignment feature on a second side of the accessory portion to interface with the first alignment feature; and an accessory-side object disposed on the second side and offset from the second alignment feature, wherein the accessory-side object is configured to engage with the mount-side object to removably secure the accessory portion to the mounting portion.

18. The mount system of claim 17, wherein the mounting portion is configured to couple to a handguard of a firearm.

19. The mount system of claim 17, wherein the accessory portion comprises at least one of a flashlight or an optic.

* * * * *